US007052605B2

(12) United States Patent
Posavac et al.

(10) Patent No.: US 7,052,605 B2
(45) Date of Patent: May 30, 2006

(54) DEVICE FOR PURIFYING LIQUIDS

(76) Inventors: Ivona Posavac, 7, In Wöhrden, Tuttlingen, DE-78352 (DE); Andreas Schmidt, 7, In Wöhrden, Tuttlingen, DE-78352 (DE); Zbiginiew Combrowski, 38, Im Gänsäcker, Tuttlingen, DE-78352 (DE)

(*) Notice: Subject to any disclaimer, the term of this patent is extended or adjusted under 35 U.S.C. 154(b) by 117 days.

(21) Appl. No.: 10/398,549

(22) PCT Filed: Oct. 5, 2001

(86) PCT No.: PCT/EP01/11505

§ 371 (c)(1),
(2), (4) Date: Sep. 25, 2003

(87) PCT Pub. No.: WO02/28505

PCT Pub. Date: Apr. 11, 2002

(65) Prior Publication Data

US 2004/0045887 A1 Mar. 11, 2004

(30) Foreign Application Priority Data

Oct. 5, 2000 (DE) ............................... 100 49 635

(51) Int. Cl.
B01D 29/01 (2006.01)
B01D 35/16 (2006.01)
B01D 36/04 (2006.01)
A47J 37/12 (2006.01)
A47J 43/28 (2006.01)

(52) U.S. Cl. ............... 210/238; 210/241; 210/299; 210/305; 210/309; 210/416.1; 210/416.5; 210/DIG. 8

(58) Field of Classification Search .......... 210/241, 210/416.1, 416.5, 232, DIG. 8, 238, 299, 210/305, 309
See application file for complete search history.

(56) References Cited

U.S. PATENT DOCUMENTS

| 2,515,538 | A | * | 7/1950 | Wall ........................... 210/169 |
| 3,172,850 | A | * | 3/1965 | Englesberg et al. ......... 210/172 |
| 3,356,218 | A | * | 12/1967 | Grudoski ..................... 210/167 |
| 3,415,181 | A | * | 12/1968 | Hart ............................ 99/408 |
| 3,447,685 | A | * | 6/1969 | Bircher ....................... 210/167 |
| 3,507,392 | A | * | 4/1970 | Bruce et al. ................ 210/172 |
| 3,630,373 | A | * | 12/1971 | Grazen ..................... 415/198.1 |
| 3,735,871 | A | * | 5/1973 | Bisko .......................... 210/167 |
| 3,886,616 | A | * | 6/1975 | Hayes ............................ 15/1.7 |
| 4,068,571 | A | * | 1/1978 | Cunningham ............... 99/408 |
| 4,618,425 | A | * | 10/1986 | Yates ....................... 210/416.1 |
| 4,880,652 | A | * | 11/1989 | Regutti ....................... 426/417 |
| 5,021,151 | A | * | 6/1991 | Yane .......................... 210/167 |

(Continued)

FOREIGN PATENT DOCUMENTS

DE 3339722 A1 * 5/1985

(Continued)

Primary Examiner—Thomas M. Lithgow
(74) Attorney, Agent, or Firm—Bachman & LaPointe, P.C.

(57) ABSTRACT

A device for cleaning liquids, in particular edible oils, by means of a filter in a filter housing, the filter being connected downstream of a pump, and a motor for driving the pump, which has a rotor having a rotor disc with vanes in an immersion housing being provided in a housing, the housing, immersion housing and filter housing together forming a unit which can be at least partially introduced into the liquid which is to be cleaned and removed therefrom.

20 Claims, 4 Drawing Sheets

U.S. PATENT DOCUMENTS 5,160,444 A * 11/1992 McFarland .................. 210/805
5,681,466 A * 10/1997 Goldberg et al. ........... 210/350
5,766,464 A *  6/1998 Campbell .................... 210/251

FOREIGN PATENT DOCUMENTS

JP            62-014824 A  *  1/1987

* cited by examiner

DEVICE FOR PURIFYING LIQUIDS

BACKGROUND OF THE INVENTION

The invention relates to a device for cleaning liquids, in particular edible oils, by means of a filter in a filter housing, the filter being connected downstream of a pump, and a motor for driving the pump, which has a rotor having a rotor disc with vanes in an immersion housing being provided in a housing, the housing, immersion housing and filter housing together forming a unit which can be at least partially introduced into the liquid which is to be cleaned and removed therefrom.

In both the domestic and the industrial sector, there are numerous liquids which have to be cleaned. These include, for example, coolant or lubricant baths in machine tools, and edible oils, for example from fryers. These are only a few examples, but the invention is intended to apply to all possible liquids which are to be cleaned.

In general, the liquid is from time to time removed from a storage tank and passed to a device for cleaning this liquid. From there, the liquid is then returned to the storage tank. Often, however, only the surface of the liquid is sucked up, so that the light, floating substances are removed. The heavier particles of impurities are then removed-at the bottom from time to time after they have settled.

The present invention relates in particular to oils originating from fryers. It is usual for these oils also to be sucked up, filtered and pumped back into the fryer. In this case, a cleaning powder, for example kieselguhr, is also scattered into the medium prior to filtration.

The cleaning of oils and fats is important because in theory, given complete cleaning, the oils and fats can be constantly reused. Given a price of approximately DM 2.00 per liter of frying oil and a reduction in service life by five to ten times, a filtration system can pay for itself within a few months.

Devices of the type described above are known, for example, from U.S. Pat. No. 3,356,218, U.S. Pat. No. 3,447,685 and in particular from U.S. Pat. No. 3,415,181. In these devices, the oil which is to be cleaned is sucked off the bottom by means of a pump and is laterally discharged from the pump into a riser. Downstream of this riser there is a filter, through which the liquid which is to be cleaned passes before then being returned to the bath via a return line.

The present invention is based on the object of providing a device which allows the liquid to be cleaned significantly more easily, more quickly and possibly without the addition of cleaning powder.

SUMMARY OF THE INVENTION

This object is achieved through the fact that the vanes are positioned on the rotor disc and apertures for liquid which is to be cleaned to pass through to reach a filter are provided in the rotor disc.

The major advantage of the present invention resides in the fact that it is now no longer necessary for the oil to be sucked out and fed to the filter, but rather the cleaning of the liquid takes place in the liquid bath itself. In this case, it is possible to use a significantly simpler device which makes do with only a small number of components. It is therefore also significantly less expensive and easier to handle. The overall result is a handheld appliance which can readily be used both in the domestic sector and in particular also in the catering industry.

In a preferred exemplary embodiment, the overall device comprises three housings which hold the main functional parts. These housings are coupled to one another in such a way that they can also quickly be disconnected from one another, so that cleaning is facilitated. For this purpose, the housings are connected to one another by means of quick-fit clamping elements, for example by means of quick-acting nuts. The housings may also at least in part be pushed into one another.

All the electronics and the drive for the pump are to be accommodated in one housing, i.e. this housing holds the motor, the electronics and suitable actuating components. This housing does not need to be immersed in the liquid, for which reason it is preferably fitted on top of an immersion housing. By contrast, the immersion housing is introduced into the liquid.

This immersion housing holds a rotor, which is used to suck up the liquid and convey it onward to the filter housing. The rotor is connected, via a suitable rod, to the above-mentioned motor in the housing which has been fitted on top. Furthermore, vanes, which may be of any desired shape and configuration, are fitted to a rotor disk of the rotor. All that is important is for these vanes to suck up liquid and force it onward into a shaft leading to the filter housing.

The rotor disk, together with a partition in the immersion housing and a ring which engages around the rotor disk, forms an almost closed housing, except for apertures in the rotor disk. The liquid is sucked through these apertures into the space and conveyed through an outlet into the above-mentioned shaft.

In another exemplary embodiment, the rotor of the pump rotates in apertures in a laminated stack. This laminated stack comprises a plurality of laminations layered on top of one another with different apertures, the diameter of the apertures increasing from an inlet toward an outlet to the shaft. The capacity of the pump is controlled in this way.

From the shaft, the liquid then passes into the filter housing, with the filter housing first of all having an antechamber in which any heavy particles can settle. This antechamber is followed by the first filter, which is preferably a metal nonwoven. This metal nonwoven is used to separate particles out of the liquid.

The metal nonwoven is surrounded by a cage, from which the liquid if required can pass to a second filter. This filter is designed in such a way that it removes flavors and odors from the liquid. By way of example, this second filter may be granules or powder in a bag. This second filter is not absolutely imperative, if, for example, the cleaning powder has already been scattered into the liquid. Depending on the particular requirements, it is also possible to provide further filter stages.

In another exemplary embodiment of the invention, the filter housing is guided on rails running along the immersion housing. The filter housing in this case comprises a shell part and a cover, the two being connected to one another by means of a hinge. After the cover has been opened, a folded filter, of which the filter surface area is significantly increased, can be inserted into the shell part.

The equipment is extremely simple to handle. The equipment is placed into the frying basket of the fryer. The filtration cycle is started by pressing a button. The cycle time is approximately 5 minutes. After the filtration has ended, the equipment is put into a drip-dry basin. Of course, it is possible for the filtration cycle to be interrupted at any time by actuation of a stop button.

BRIEF DESCRIPTION OF THE DRAWINGS

Further advantages, features and details of the invention will emerge from the following description of preferred exemplary embodiments and with reference to the drawing, in which.

DETAILED DESCRIPTION

Figure 1:
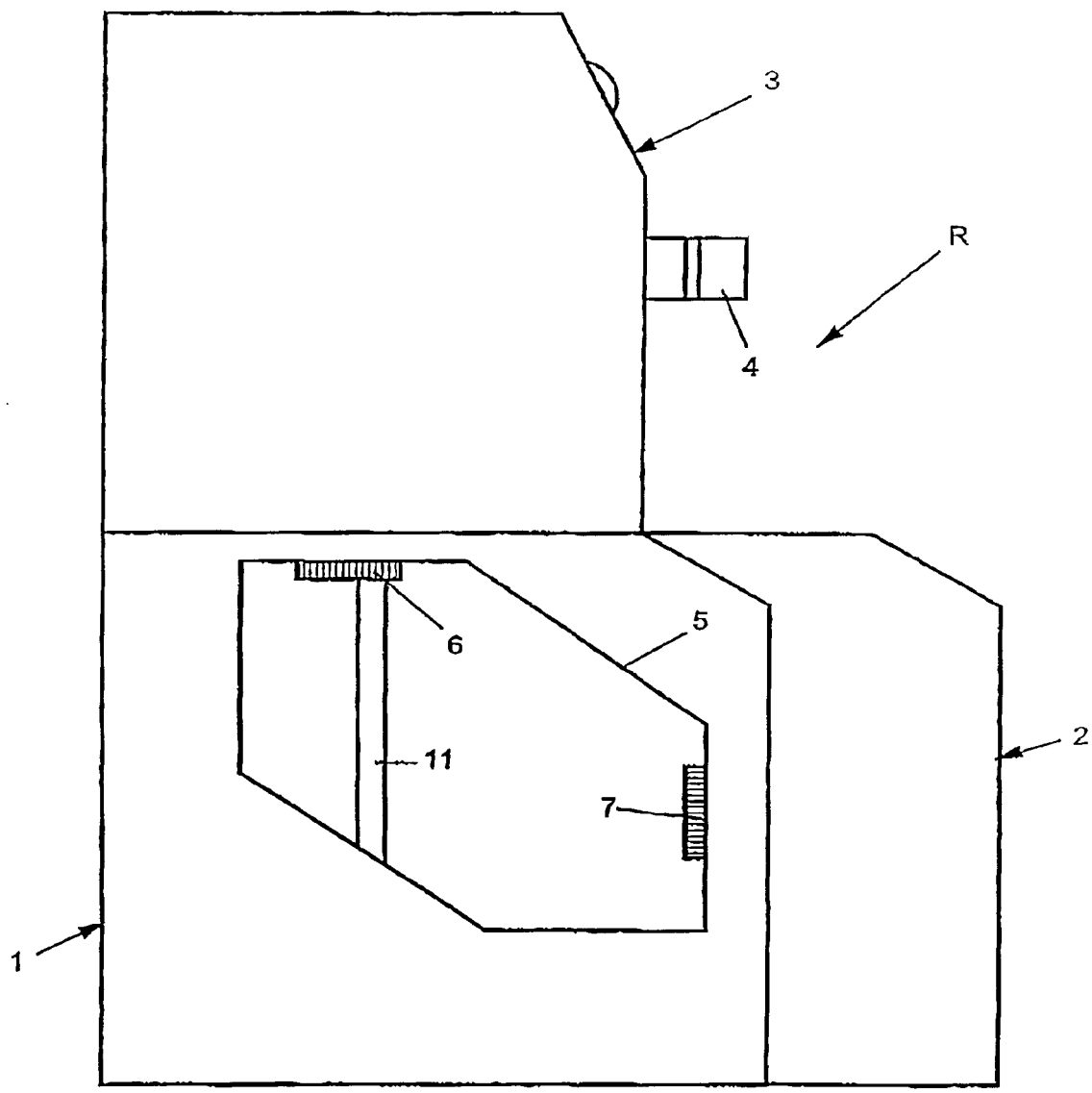
FIG. 1 shows a side view of a device for cleaning liquids according to the invention.
Figure 2:
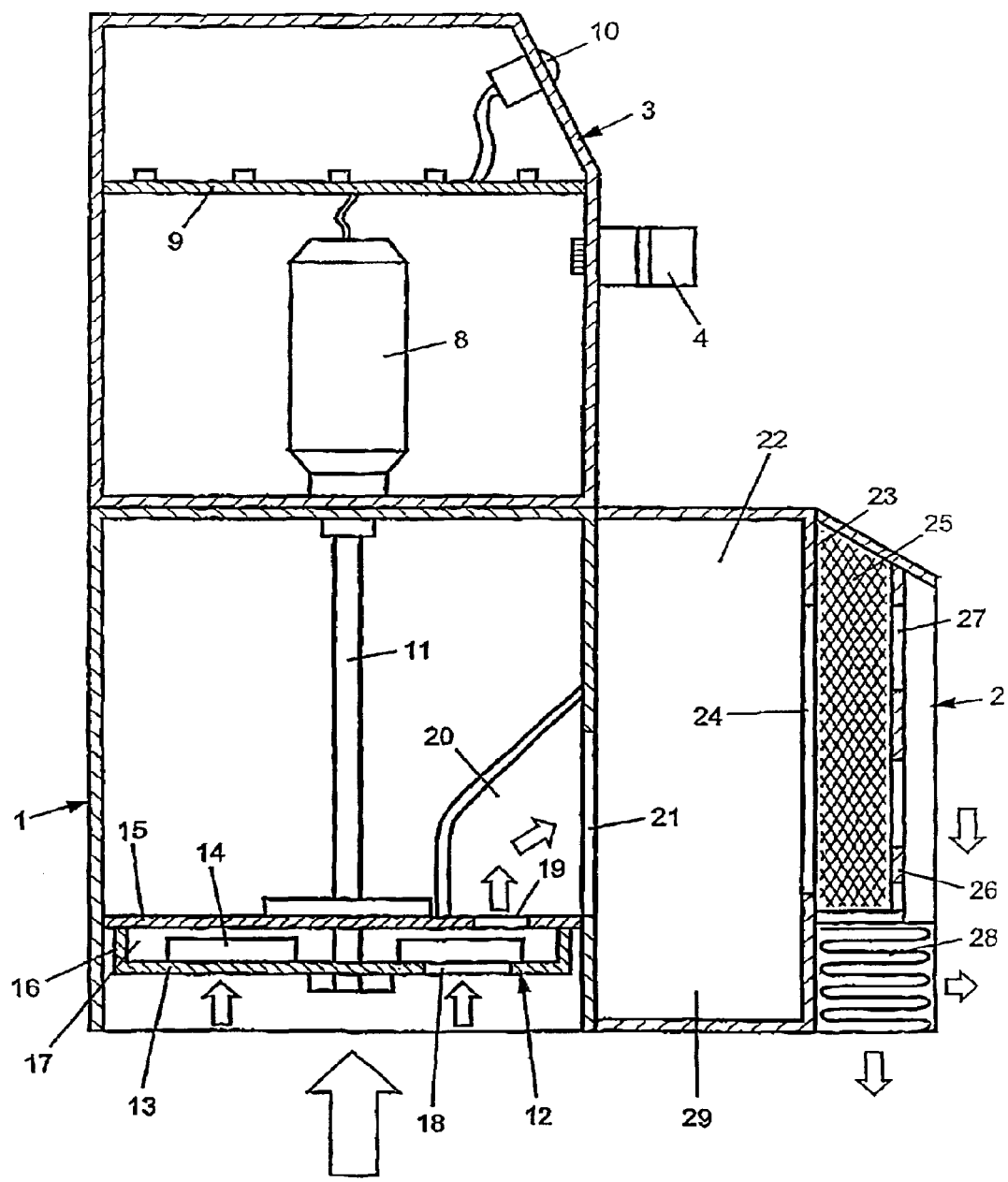
FIG. 2 shows a longitudinal section through the device shown in FIG. 1.
Figure 3:
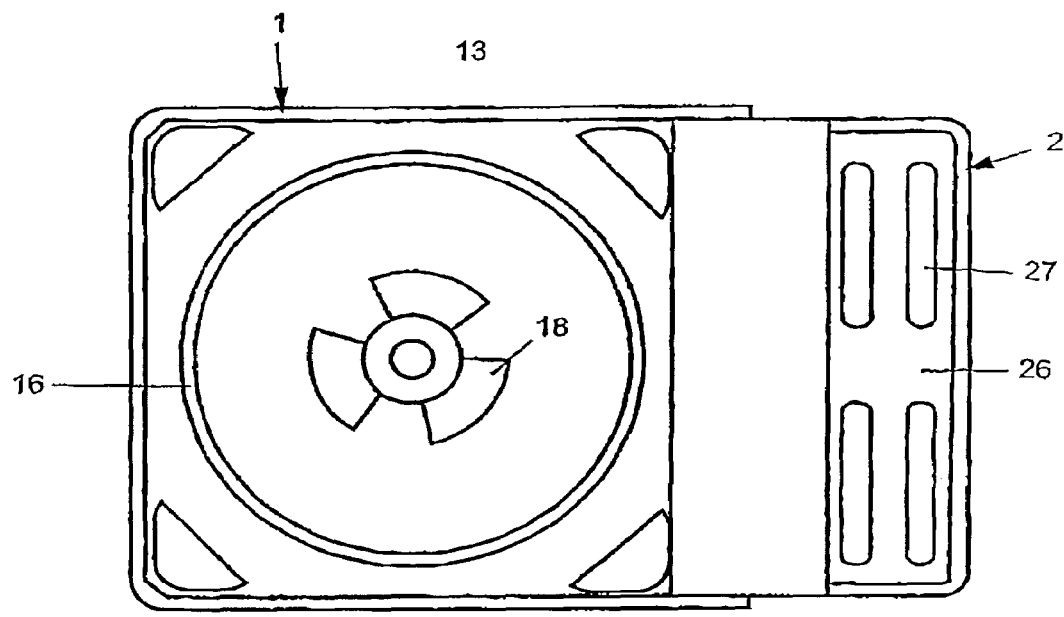
FIG. 3 shows a view of the device shown in FIG. 1 from below.

In accordance with FIGS. 1 and 2, a device for cleaning liquids according to the invention includes an immersion housing 1, to the side of which a filter housing 2 is connected. Furthermore, a further housing 3 is fitted onto the immersion housing 1 and has on it a handle 4, by means of which the entire device R can be carried.

A cutout 5 in the immersion housing 1 reveals quick-acting nuts 6 and 7, by means of which the housing 3 and the filter housing 2, respectively, can be connected to the immersion housing 1.

In the housing 3, as shown in FIG. 2, there is a motor 8, which is controlled by electronics 9. There are suitable operating buttons 10 for actuation purposes.

Via a rod 11 which extends through the immersion housing 1, the motor 8 drives a rotor 12, which substantially comprises a rotor disk 13 with vanes 14 fitted to it. The rotor disk 13 is provided below a partition 15, the rod 11 extending through this partition. The partition 15, a ring 16 and the rotor 12 form a space 17 into which, when the rotor 12 rotates, liquid can be sucked through apertures 18 in the rotor disk 13.

This liquid is then forced through an outlet 19 into a shaft 20 which is still inside the immersion housing 1. From the shaft 20, the liquid passes through a window 21 into the filter housing 2.

In the filter housing 2, there is an antechamber 22, which is separated from a first filter 25 by a partition 23 with openings 24. This filter is preferably a metal filter, for example a stainless-steel nonwoven. This first filter is held by a cage 26 which in turn is provided with openings 27. Beneath the cage 26 there is a second filter 28, which is preferably a filter bag containing a cleaning powder.

Figure 4:
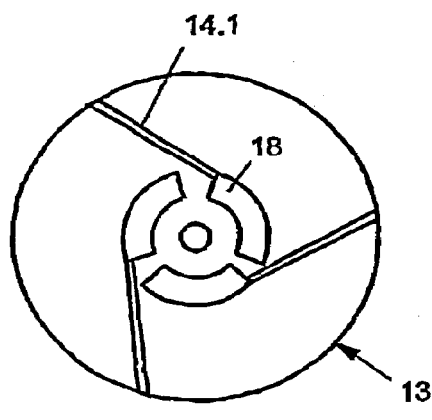
FIGS. 4 and 5 show a plan view of two exemplary embodiments of rotor disks with vanes fitted to them.
Figure 5:
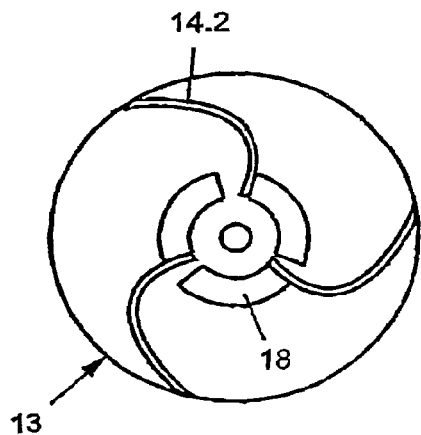

FIGS. 4 and 5 show two different variants of vanes 14.1 and 14.2. The vanes 14.1 are straight, while the vanes 14.2 are Archimedean.

The present invention operates in the following way:

In the assembled state shown in FIG. 1, the device R according to the invention is picked up by the handle 4 and introduced into a liquid which is to be cleaned. In the process, the immersion housing 1 and the filter housing 2 are at least partially immersed in the liquid which is to be cleaned.

Then, the motor 8 is started up by means of the operating button 10 and drives the rotor 12 via the rod 11. The rotor 12 uses its rotor vanes 14 to suck liquid through the apertures 18 into the space 17, as indicated by the corresponding arrows. Furthermore, it forces the liquid through the outlet 19 into the shaft 20, from where the liquid passes into the antechamber 22 of the filter housing 2. From here, the liquid is forced through the first filter 25, which above all filters particles out of the liquid. These particles can, for example, be collected in a collecting trough 29 formed in the lower region of the antechamber 22.

From the first filter 25, the liquid passes through the openings 27 to the second filter 28, which is intended in particular to filter odors and flavors out of the liquid. Then, the cleaned liquid is returned to the liquid bath.

After it has been used, the device R can be cleaned in a very simple way. By releasing the quick-acting nuts 6 and 7, it is possible to detach the filter housing 2 and the housing 3 from the immersion housing 1. In particular, it is now easy to clean the filter housing 2, it being possible for the filter 28 to be removed from its space. If appropriate, the cage 26 may also be designed to be removable.

Figure 6:
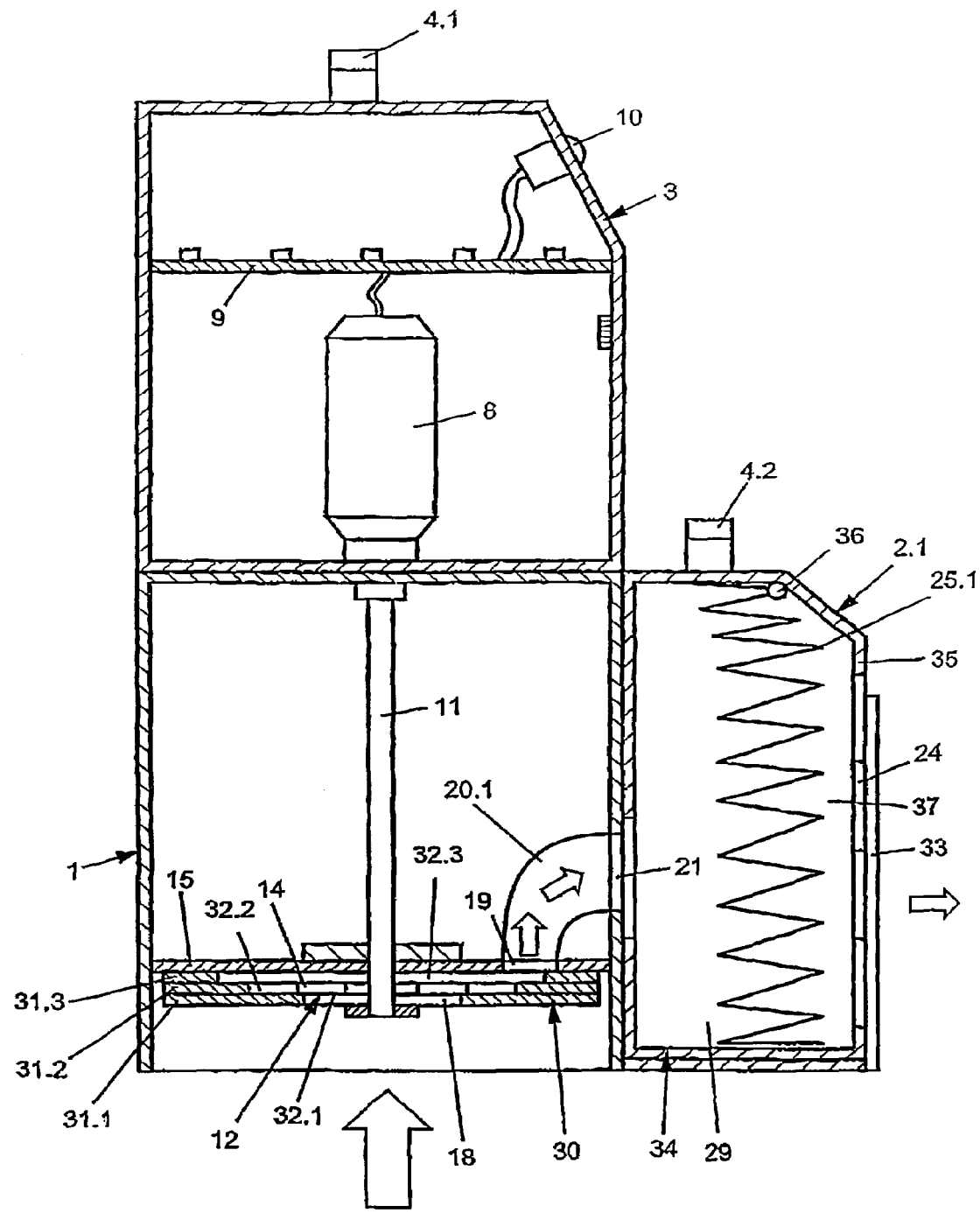
FIG. 6 shows a longitudinal section through a further exemplary embodiment of the device shown in FIG. 1.

In a further exemplary embodiment of the invention as shown in FIG. 6, the rotor 12 rotates within a laminated stack 30 which is arranged beneath the partition 15. This laminated stack 30 comprises three laminations 31.1 to 31.3 which have different apertures 32.1 to 32.2. The aperture 32.1 is approximately circular in design and has the smallest diameter. The aperture in the lamination 31.2 is likewise circular, but has a larger diameter than the aperture 32.1. The aperture 32.3 in the lamination 31.3 is only partially circular in design and on one side has an extension leading to the shaft 20.1. In the present exemplary embodiment, this shaft 20.1 is designed more as a pipeline.

In the exemplary embodiment shown in FIG. 6, the filter housing 2.1 is of removable configuration in that it is fitted in rails 33 which are connected to the immersion housing 1. To remove it from the rails 33, the filter housing 2.1 is pulled upward by the handle 4.2.

Furthermore, the filter housing 2.1 comprises a shell part 34 and a cover 35, the shell part 34 and cover 35 being connected to one another by means of a hinge 36. Folding open the cover 35 creates access to an interior 37 of the filter housing 2.1, in which a pleated filter 25.1 which has been folded up is inserted. This folded arrangement significantly increases the surface area of the filter 25.1.

In the shell part 34 there are holding means (not shown in more detail) for the filter 25.1, which are configured in such a way that they provide the filter 25.1 with sufficient strength.

After it has flowed through the filter 25.1, the cleaned liquid emerges through the openings 24 and returns to the cleaning bath, as indicated by the arrow.

The invention claimed is:

1. A device for cleaning liquids comprises a submersible pump, a filter (25, 25.1) connected downstream of the pump (8, 11, 12), wherein the filter and the submersible pump form a unit which is at least partly introduced into a liquid to be cleaned, the submersible pump comprises a rotor (12) having a rotor disk (13), wherein the rotor disk (13) has a plurality of apertures (18).

2. The device for cleaning liquids as claimed in claim 1, wherein a shaft (20, 20.1) is positioned between the pump (8, 11, 12) and the filter (25, 25.1) for supplying the liquid.

3. The device for cleaning liquids as claimed in claim 1, including a housing (3) for a motor (8) for driving the pump (11, 12).

4. The device for cleaning liquids as claimed in claim 3, wherein the housing (3) is seated on an immersion housing (1) which includes the rotor (12) of the pump.

5. The device for cleaning liquids as claimed in claim 4, wherein the immersion housing (1) is connected to the housing (3) by means of quick-fit clamping elements (6).

6. The device for cleaning liquids as claimed in claim 4, wherein the rotor disk (13) is connected to the motor (8) via a rod (11), and is fitted with vanes (14, 14.1, 14.2).

7. The device for cleaning liquids as claimed in claim 3, wherein a handle (4, 4.1, 4.2) for transportation is provided on the housing (3).

8. The device for cleaning liquids as claimed in claim 6, wherein the rotor disk (13) is arranged beneath a partition (15) and in a ring (16).

9. The device for cleaning liquids as claimed in claim 4, wherein the rotor (12) rotates in a laminated stack (30), the laminations (31.1–31.3) having apertures (32.1–32.3).

10. The device for cleaning liquids as claimed in claim 9, wherein the apertures (32.1–32.3) increase in size in the direction of the shaft (20.1).

11. The device for cleaning liquids as claimed in claim 8, wherein an outlet (19) leading to the shaft (20, 20.1) is provided in the partition (15).

12. The device for cleaning liquids as claimed in claim 1, wherein the filter (25, 25.1) is positioned in a filter housing (2, 2.1).

13. The device for cleaning liquids as claimed in claim 12, wherein the filter housing (2) is removably attached to an immersion housing (1).

14. The device for cleaning liquids as claimed in claim 13, wherein the filter housing (2) is connected to the immersion housing (1) by means of quick-fit clamping elements (7).

15. The device for cleaning liquids as claimed in claim 13, wherein the filter housing is guided on rails (33) on the immersion housing (1).

16. The device for cleaning liquids as claimed in claim 1, wherein the filter (25) is a metal filter.

17. The device for cleaning liquids as claimed in claim 1, wherein a further filter (28) is arranged downstream of the filter (25).

18. The device for cleaning liquids as claimed in claim 1, wherein the filter (25.1) comprises a pleated textile material.

19. The device for cleaning liquids as claimed in claim 17, wherein the filters (25, 25.1, 28) are positioned exchangeably in a filter housing (2, 2.1).

20. A method for cleaning liquids, comprising providing a pump (8, 11) having a downstream filter (25, 25.1) which together form a unit, wherein the pump comprises a rotor disk (13) having a plurality of apertures (18), introducing the unit into a liquid which is to be cleaned, feeding with the pump the liquid through the filter, and returning the liquid to a liquid bath immediately downstream of the filter.

* * * * *